United States Patent [19]
Pakula et al.

[11] 3,919,247
[45] Nov. 11, 1975

[54] METHOD OF MANUFACTURING OF INDOLYL ACETIC ACIDS

[75] Inventors: Ryszard Pakula; Jan Wojciechowski; Halina Poslinska; Lidia Pichnej, all of Warsaw; Leszek Ptaszynski, Lodz; Adam Przepalkowski, Lodz; Roman Logwinieko, Lodz, all of Poland

[73] Assignee: Lodzkie, Zaklady Farmaceutyczne POLFA, Lodz, Poland

[22] Filed: Apr. 17, 1974

[21] Appl. No.: 461,751

Related U.S. Application Data

[63] Continuation of Ser. No. 72,118, Sept. 14, 1970, abandoned, which is a continuation-in-part of Ser. No. 784,923, Sept. 18, 1968, abandoned.

[52] U.S. Cl. 260/295 B; 260/295.5 B; 260/326.13 A; 260/556 H; 424/266; 424/274
[51] Int. Cl.² ................................ C07D 213/56
[58] Field of Search . 260/326.13 A, 295 B, 295.5 B

[56] References Cited
UNITED STATES PATENTS

| | | | |
|---|---|---|---|
| 3,527,796 | 9/1970 | Sletzinger et al. | 260/295 B |
| 3,564,008 | 2/1971 | Yamamoto et al. | 260/326.13 A |

Primary Examiner—Alan L. Rotman
Attorney, Agent, or Firm—Irvin A. Lavine

[57] ABSTRACT

Method of manufacture of indolyl acetic acids by reacting 1-(p-alkoxyphenyl)- or 1-(p-benzyloxyphenyl)-2-formyl hydrazine with an acid chloride or acid anhydride of an acid selected from the group consisting of benzoic acid, halobenzoic acid, nicotinic acid and isonicotinic acid, and reacting the reaction product with levulinic acid in an anhydrous medium in the presence of hydrogen chloride.

4 Claims, No Drawings

METHOD OF MANUFACTURING OF INDOLYL ACETIC ACIDS

This application is a continuation of application Ser. No. 72,118 filed Sept. 14, 1970 which in turn is a continuation-in-part of Ser. No. 784,923 filed 09-18-68 both now abandoned.

The subject of the invention is a method of manufacture of indolyl acetic acids for the formula

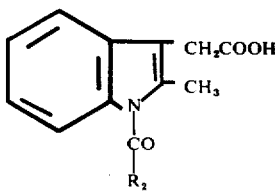

where $R_1$ is selected from the group consisting of a lower alkyl group containing 1 – 4 carbon atoms (including normal and branched alkyl) and benzyl, and $R_2CO-$ is selected from the group consisting of benzoyl, halobenzoyl, nicotinoyl and isonicotinoyl.

These indolyl acetic acids are pharmacologically active compounds. Their toxicity is low, and they have anti-phlogistic properties accompanied by an antipyretic activity which is much stronger than that of salicylic acid, p-aminophenol, and butazolidine derivatives. They prevent or inhibit the granuloma tissue formation. These compounds also include some which are used in medicine in cases requiring administration of antiphlogistic drugs. Thus, for example 1-(p-chlorobenzoyl)-2-methyl-5-methoxy-indolyl-3-acetic acid has been used as antipyretic and antiphlogistic agent in the therapy of rheumatic, arthritic and dermatological diseases. 1-nicotinoyl-2-methyl-5-methoxy-indolyl-3-acetic acid has similar properties.

Known methods of obtaining the indolyl acetic acids consist of two principal stages: First, the indole ring is obtained from p-alkoxyphenylhydrazine, and in the second stage it is acylated in the 1-position; Second, in the acylation stage, a salt of non-acylated indolyl acetic acid is used; such salts are prepared by action of NaH, $NaNH_2$, or $KNH_2$ on the free acid. The yield of the acylation is usually very low, and in the industrial scale the acylation is dangerous and complicated. Due to the possibility of side reactions free non-acylated indole acetic acids cannot be used in the acylation process; they must be first esterfied, and after the acylation the ester must be hydrolyzed. The hydrolysis cannot be carried out by the conventional methods since the acyl substituent is very readily removed by cleavage. For this reason methyl and ethyl esters were hydrolyzed by means of enzymes, and tertiary butyl esters were decomposed by pyrolysis. Both these methods of cleaving the esters are inconvenient, especially in manufacturing processes, and moreover, the yields are low.

In another method the p-alkoxyphenylhydrazones are acylated, and the resulting 1-acyl-1-p-alkoxy-phengl-hydrazones are hydrolyzed to free 1-acyl-1-p-alkoxyphenyl-hydrazines, which are reacted with levulinic acid. Alternatively 1-acyl-p-alkoxyphenylhydrazones are directly reacted with levulinic acid. A serious disadvantage is that the phenyl-hydrazones used as the starting materials in these methods are unstable, particularly since the least stable are the cheapest and readily available phenylhydrazones, such as those of acetaldehyde and benzaldehyde, which decompose at ambient temperatures in the presence of air and contaminate the intermediate and final products of syntheses [H. Yamamoto et al., Chem. Pharm. Bull. 6 (4), P. 647–653, 1968]. The final product of the direct reaction of 1-acyl-1-p-alkoxyphenyl-hydrazones with levulinic acid is also contaminated by products of polymerization or oxidation of aldehydes or ketones, that are formed as by-products of the reaction.

In accordance with the instant invention the starting material is a stable 1-p-alkoxy-phenylhydrazide of formic acid, or a 1-p-benzyloxy-phenylhydrazide of formic acid. These starting materials on acylation give new compounds, which are reacted with levulinic acid. Thus the disadvantages of the use of an unstable p-alkoxyhydrazone as a starting material in the previously described known method have been eliminated. The 1-p-alkoxyphenylhydrazides or 1-p-benzyloxyphenyl-hydrazides of formic acid are readily accessible, cheap, and stable, and can be obtained in accordance with the procedure in Polish patent application No. P 124128.

According to the literature [N. N. Suworow et al., Zh. Obshch. Khim., 28, 1090–1097, 1958] bis-acyl derivatives of phenylhydrazides give non-acylated indole derivatives. Therefore it is an unexpected discovery that by suitably choosing the acyl substitutents in p-alkoxyphenyl-hydrazine or in p-benzyloxyphenylhydrazine, so that the substituent at the nitrogen atom in the 1-position is $R_2CO-$, as defined above, and the substituent at the nitrogen atom in the 2-position is a formyl radical, it becomes possible to obtain the said acylated indolyl acetic acids by means of a simple one-stage procedure and in a high yield.

According to the invention a phenylhydrazide of the formula

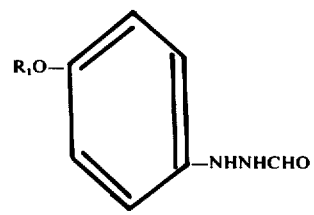

where $R_1$ is selected from a group consisting of lower alkyl group containing 1–4 carbon atoms and benzyl, is reacted with a compound selected from a group consisting of acid chloride of the formula $R_2COCl$ and an acid anhydride of the formula $(R_2CO)_2O$, where $R_2CO-$ is selected from a group consisting of benzoyl, holobenzoyl, nicotinoyl, and isonicotinoyl, and the resulting acylated phenylhydrazide of the formula

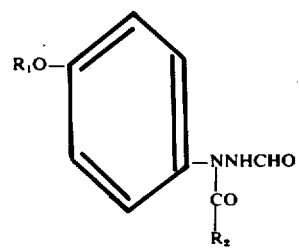

is reacted with levulinic acid in an anhydrous medium in the presence of gaseous hydrogen chloride at a temperature of about 10°C to about 100°C, preferably about room temperature to about 80°C and more preferably at an elevated temperature about 40°C to about 80°C. In the condensation with the levulinic acid and cyclization with hydrogen chloride, the indolyl acetic acids of the formula

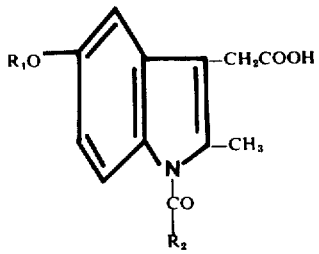

are formed.

The reaction with said acid chloride of the formula R₂COCl is carried out at a temperature of about 0°C to about 60°C, preferably about 0°C to about room temperature, in the presence of a tertiary amine selected from a group consisting of pyridine and N,N-dimethylaniline, which tertiary amine combines with hydrogen chloride that is evolved during the reaction. The reaction can be carried out in a solvent such as benzene or in an excess of the said tertiary amine.

Alternatively the reaction with the acid chloride of the formula R₂COCl is carried out in the presence of an organic solvent selected from a group consisting of benzene, lower alkyl benzene homologues such as toluene and xylene, tetrahydrofuran and chloroform, at the temperature of the boiling point of the reaction mixture until the time when the evolution of hydrogen chloride ceases.

The reaction with acid anhdyride of the formula (R₂CO)₂O is carried out by heating the reaction mixture, preferably at the boiling point of the mixture, in an organic solvent selected from a group consisting of benzene, lower alkyl benzene homologues such as toluene and xylene, tetrahydrofuran and chloroform. Alternatively the reaction with an acid anhydride of the formula (R₂CO)₂O is carried out directly, that is in the absence of solvents at a temperature of about 120°C to about 160°C, preferably about 140°C to about 150°C.

Acylated phenylhydrazides are isolated from the reaction mixture and may be purified by crystallization. These compounds, which have not been described in the literature, are reacted with levulinic acid using excess levulinic acid as solvent, or in an organic solvent selected from the group consisting of acetic acid, benzene, lower alkyl benzene homologues such as toluene and xylene, in an anhydrous medium in the presence of the hydrogen chloride at a temperature of about 10°C to about 100°C, preferably at about room temperature to about 80°C and most preferably at an elevated temperature such as about 40°C to about 80°C.

The amount of hydrogen chloride is not critical and it may range within wide limits, from the amount near stoichiometric with reference to ammonium arising in the cyclization (under complete hermetic sealing of apparatus) to an amount e.g. twice as great as the stoichiometric amount. In any example, in which no hermetic sealing of apparatus was employed, hydrogen chloride was used in an excess of about 50% to about 100% of the stoichiometric amount. The hydrogen chloride is employed in a relatively minor amount in the reaction mixture, typically about 4% to about 10% by weight of the reaction mixture.

The reaction products are isolated by filtering, sometimes after partial evaporation of the reaction mixture, or after precipitating with water or other solvent. The crude products are purified by known methods.

The following example illustrate the invention.

Example I 35 g. of 1-(p-methoxyphenyl)-2-formyl hydrazide are introduced into 160 ml of anhydrous benzene and 11.9 g of p-chlorobenzoyl chloride are then added. The mixture is refluxed for about 2 hours until the evolution of hydrogen chloride ceases; it is then cooled and the product filtered off and dried. The yield of 1-(p-chlorobenzoyl)-1-(p-methoxyphenyl)-2-formylhydrazine, having a melting point of 102°–108°C is 47.6 g.

This product is mixed with 160 g of levulinic acid to which an anhydrous medium of 10.6 g of hydrogen chloride are added and the mixture is heated at 60°–70°C for about 3 hours and poured into 200 ml of water. The product is filtered off and, after drying, it is purified by crystallization from a mixture consisting of equal volumes of diethyl ether and petroleum ether. The yield of 1-(p-chlorobenzoyl)-2-methyl-5-methoxyindolyl-3-acetic acid, having a melting point of 153°–155°C, is 48.6 g.

Example II 14.1 of benzoyl chloride are added during 15 minutes, at 5°C, with stirring, to 16.6 g. of 1-(p-methoxyphenyl)-2-formylhydrazine in 80 ml of dry pyridine. The mixture is kept at a temperature below 10°C for 3 hours, and then it is allowed to stand at room temperature overnight. On the following day the mixture is poured into 200 ml of cold water. An oil separates, and after a certain time, it solidifies. The crystalline product is filtered off, and after washing with water it is recrystallized from ethanol. The yield of 1-benzoyl-1-(p-methoxyphenyl)-2-formylhydrazine, having a melting point of 130°–132°C, is 20 g. It is dissolved in 75 g of levulinic acid, the solution is saturated with 4 g of dry hydrogen chloride, and after heating at about 50°C for 2 hours, it is allowed to stand at room temperature overnight. On the following day the product is filtered off and is recrystallized from methanol. The yield of 1-benzoyl-2-methyl-5-methozyindolyl-3-acetic acid, having a melting point of 171°–172°C, is 20 g.

Example III 17.5 g of p-chlorobenzoyl chloride are added during about 30 minutes, with stirring, to 16.6 g of 1-(p-methoxyphenyl)-2-formyl hydrazine suspended in 80 ml of dry pyridine. The mixture is stirred for an additional three hours at room temperature and is allowed to stand overnight. On the following day the reaction mixture is poured into 200 ml of cold water, the aqueous layer is decanted and the oily product is crystallized from methanol and dried. The yield of 1-(p-chlorobenzoyl)-1-(p-methoxyphenyl)-2-formyl hydrazine, having a melting point of 129°–131°C, is 21.7 g. It is dissolved in a mixture consisting of 33 g of levulinic acid and 30 ml of acetic acid. The solution is saturated with 5 g of dry hydrogen chloride, and is heated at 50°C for 3 hours. After this time the acetic acid is removed from the reaction mixture by distillation under reduced pressure, and the residue is crystallized from a mixture of equal volumes of ethanol and water. The yield of 1-(p-chlorobenzoyl)-2-methyl-5-methoxyindolyl-3-acetic acid, having a melting point of 154°–155°C, is 20.2 g.

Example IV 18 g of p-chlorobenzoic anhydride are added to 8.3 g of 1-(p-methoxyphenyl)-2-formylhydrazine, the mixture is heated at 140°–150°C for 5 hours, and after cooling it is ground in a mortar. The powder is treated three times with 10% aqueous sodium carbonate solution in order to remove p-chlorobenzoic acid, each time using 100 ml of the solution. This operation is carried out at 30°C during about 30 minutes. The remaining precipitate is purified by crystallization from benzene. The yield of 1-(p-chlorobenzoyl)-1-(p-methoxyphenyl)-2-formyl hydrazine, having a melting point of 122°–125°C, is 11.9 g. It is used in the reactions of condensation with levulinic acid and cyclization according to the method described in Example III.

Example V 7.2 g of isonicotinoyl chloride are added vigorous stirring below 10°C during 30 minutes to 8.3 g of 1-(p-methoxyphenyl)-2-formyl hydrazine in 20 ml of dry pyridine. The mixture is stirred at room temperature for 3 additional hours and is allowed to stand at room temperature overnight. On the following day the reaction mixture is poured into 200 ml of cold water and the precipitate which separates is filtered off and is recrystallized from methanol. The yield of 1-(isonicotinoyl)-1-(p-methoxyphenyl)-2-formyl hydrazine, having a melting point of 147°–149°C, is 10.1 g. This product is mixed with 15 g. of levulinic acid and 2g of hydrogen chloride gas are added; the mixture is heated at 60°C for 3 hours, and is poured into 50 ml of water. The precipitate that separates is filtered off, and after drying is recrystallized from acetone. The product is 1-isoniconinoyl-2-methyl-5-methoxyindolyl-3-acetic acid, having a melting point of 164°–165°C.

Example VI 7.2 g of nicotinoyl chloride are added with stirring at room temperature during 15 minutes to 8.3 g of 1-(p-methoxyphenyl)-2-formylhydrazine suspended in a mixture of 20 ml of benzene and 10 ml of pyridine. The reaction mixture is kept at room temperature for 3 hours. Then the benzene layer is decanted and the oily residue is washed with 20 ml of benzene and is dissolved in methanol. The solution is heated with charcoal, and is filtered. By adding water to the filtrate a precipitate is obtained, which is filtered off, and is crystallized from dilute methanol. The product is 1-nicotinoyl-1-(p-methoxyphenyl)-2-formylhydrazine having a melting point of 139°–140°C. 9.5 g of this product are added to 12 g of levulinic acid, the mixture is saturated with 1.8 g of hydrogen chloride gas, and is heated at 40°C for 5 hours. After this time the reaction mixture is poured into 100 ml of water, a precipitate that separates is filtered off, and is recrystallized from a mixture of acetone and water. The yield of 1-nicotinoyl-2-methyl-5-methoxy-indolyl-3-acetic acid having a melting point of 188°–189°C, is 7.8 g.

Example VII 11.3 g of 1-(p-benzyloxyphenyl)-2-formylhydrazine are suspended in 280 ml of benzene, 5.7 g of N,N-dimethylaniline are added, the mixture is heated to 50°C and 6.6 g of nicotinoyl chloride are added dropwise during 30 minutes. The reaction mixture is heated at 50°C for an additional 2.5 hours, then it is cooled, and the precipitate that separates is filtered off and is recrystallized from methanol. The yield of 1-(nicotinoyl)-1-(p-benzyloxyphenyl)-2-formylhydrazine having a melting point of 168°–170°C, is 11.3 g. It is suspended in 135 ml of benzene and 16 g of levulinic acid. The mixture is saturated with hydrogen chloride gas until the precipitate dissolves. During this time a layer of oil insoluble in the reaction medium appears. The mixture is heated at 50°C for 3 hours, then it is cooled, the solvent is decanted and the remaining oil is poured into 100 ml of water. The precipitate that separates is filtered off and is recrystallized from a mixture of equal volumes of methanol and acetone containing some charcoal. The yield of 1-nicotinoyl-2-methyl-5-benzyloxyindolyl-3-acetic acid, having a melting point of 202°–204°C, is 10.4 g.

Example VIII

A suspension of 10.1 g of 1-(p-benzyloxyphenyl)-2-formylhydrazine in 300 ml of benzene and 5.1 g of N,N-dimethylaniline is heated to 50°C and 7.4 g of p-chlorobenzoyl chloride are added dropwise during 30 minutes. Then the reaction mixture is stirred at 50°–60°C for three hours, and after cooling, the precipitate that separates is filtered off. It is washed with 20 ml of benzene, then with 20 ml of ethanol, and it is then dried. The yield of 1-(p-chlorobenzoyl)-1-(p-benzoyloxyphenyl)-2-formylhydrazine, having a melting point of 204°–206°C, is 12.4 g. After recrystallization from a mixture of equal volumes of methanol and acetone the product melts at 207°–208°C. It is introduced into a mixture of 300 ml of benzene and 30 g of levulinic acid. The mixture is saturated with hydrogen chloride gas during 30 minutes until the precipitate dissolves, and is allowed to stand overnight at room temperature. On the following day the mixture is heated at 80°C for 7 hours; then it is cooled, the benzene layer is washed with water in order to remove levulinic acid, and the benzene is removed by distillation. The residue is crystallized from 70% ethanol. The yield of 1-(p-chlorobenzoyl)-2-methyl-5-benzyloxyindolyl-3-acetic acid, having a melting point of 182°–183°C, is 10.6 g.

Example IX 41.5 g of 1-(p-methoxyphenyl-2-formylhydrazine are suspended in a mixture of 500 ml of benzene and 34 g of N,N-dimethylaniline, and 43.7 g of p-chlorobenzoyl chloride are added dropwise at 48°–50°C during 2 hours. The reaction mixture is heated at 48°–50°C for an additional hour; then it is cooled and the precipitate that separates is filtered off and is washed with 100 ml of benzene. Then the precipitate is ground with 400 ml of water in order to remove N,N-dimethylaniline hydrochloride and after filtering it is dried. The yield of 1-(p-methoxyphenyl)-1-(p-chlorobenzoyl)-2-formylhydrazine, having a melting point of 123°–125°C is 68.5 g. This product is dissolved in a mixture of 200 ml of acetic acid, 80 g of levulinic acid, and 16 g of dry hydrogen chloride. The reaction mixture is stirred at room temperature for 2 hours and then at 60°C for 3 hours. The reaction mixture is then cooled to room temperature and 200 ml of water added. The precipitate that separates is recrystallized from an equal volume mixture of acetone and water. The yield of 1-(p-chlorobenzoyl)-2-methyl-5-methoxyindolyl-3-acetic acid, having a melting point of 154°C, is 64.5 g.

We claim:

1. A method of manufacture of indolyl acetic acids of the formula

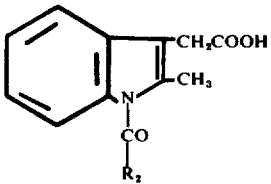

where $R_1$ is selected from the group consisting of a lower alkyl group containing 1–4 carbon atoms and benzyl, and $R_2CO-$ is selected from the group consisting of benzoyl, halobenzoyl, nicotinoyl, and isonicotinoyl; consisting essentially of reacting phenylhydrazide of the formula

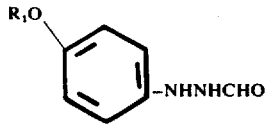

where $R_1$ has the above defined significance with a compound selected from the group consisting of an acid chloride of the formula $R_2COCl$ and an acid anhydride of the formula $(R_2CO)_2O$, where $R_2CO-$ has the above defined significance, wherein when said acid chloride is employed, the reaction is in the presence of a tertiary amine selected from the group consisting of pyridine and N,N-dimethylaniline at a temperature of about 0°C to about 60°C. or in the presence of an organic solvent selected from the group consisting of benzene, a lower alkyl benzene homologue tetrahydrofuran and chlorofuran at a temperature of about the boiling point of the reaction mixture until the time when the evolution of hydrogen chloride ceases, and when said acid anhydride is employed, the reaction is in the presence of an organic solvent selected from the group consisting of benzene, a lower benzene homologue, tetrahydrofuran and chloroform at the boiling point of the reaction mixture or direct in the absence of a solvent at a temperature of about 120°C to about 160°C; thereby forming an acylated phenylhydrazide of the formula

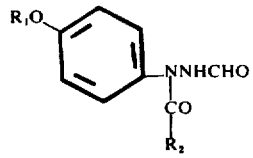

where $R_1$ and $R_2$ have the above defined significance; and reacting said acylated phenylhydrazide with levulinic acid in an anhydrous medium in the presence of gaseous hydrogen chloride at a temperature of about 10°C to about 100°C.

2. A method as claimed in claim 1, wherein the anhydrous medium is a solvent selected from the group consisting of benzene, a lower alkyl benzene homologue, acetic acid and excess of levulinic acid.

3. A method as claimed in claim 1, wherein the reaction between said acylated phenylhydrazide and levulinic acid is carried out at a temperature of about 10°C to about 100°C.

4. A method of manufacture of indolyl acetic acids of the formula

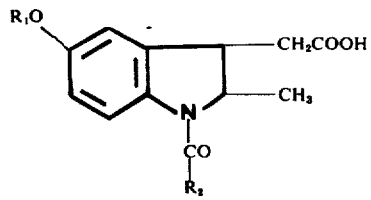

where $R_1$ is selected from the group consisting of a lower alkyl group containing 1–4 carbon atoms and benzyl, and $R_2CO-$ is selected from the group consisting of benzoyl, halobenzoyl, nicotinoyl, and isonicotinoyl; consisting essentially of reacting an acylated phenylhydrazide of the formula

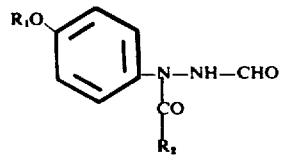

where $R_1$ and $R_2$ have the above defined significance, with levulinic acid in an anhydrous medium in the presence of gaseous hydrogen chloride at a temperature of about 10°C to about 100°C.

* * * * *